United States Patent [19]

Long et al.

[11] 4,375,300
[45] Mar. 1, 1983

[54] FRAMING SYSTEM FOR AIRCRAFT PASSENGER SEAT

[75] Inventors: William A. Long, Harwinton; Ward E. Fischer, Torrington; Rene J. Brunelle, Wolcott, all of Conn.

[73] Assignee: UOP Inc., Des Plaines, Ill.

[21] Appl. No.: 208,955

[22] Filed: Nov. 20, 1980

[51] Int. Cl.³ .............................................. A47C 15/00
[52] U.S. Cl. ............................. 297/232; 244/122 R; 248/188.1; 297/445
[58] Field of Search .................... 297/232, 445; 248/188.1; 244/122 R, 118.6; 296/64; D6/45, 48, 59, 69

[56] References Cited

U.S. PATENT DOCUMENTS

| | | | |
|---|---|---|---|
| 2,577,817 | 12/1951 | Schueder et al. | 244/122 R |
| 2,933,127 | 4/1960 | Brewster | 244/122 R |
| 3,348,882 | 10/1967 | Chassaignac | 297/445 X |
| 3,468,582 | 9/1969 | Judd | 244/122 R |
| 4,099,780 | 7/1978 | Schmidhuber | 297/232 X |
| 4,229,040 | 10/1980 | Howell et al. | 297/417 X |

FOREIGN PATENT DOCUMENTS 1590061  5/1981  United Kingdom ............... 297/232

Primary Examiner—James T. McCall
Attorney, Agent, or Firm—James R. Hoatson, Jr.; Barry L. Clark; William H. Page, II

[57] ABSTRACT

Improved framing system for a multi-passenger seat incorporates a generally inverted L-shaped rear leg whose shorter leg portion is joined to the rear stretcher tube at its free end and to a compression member at its point of intersection with its longer leg portion. The compression member and short leg portion form one side of a triangle which includes the front leg and a support member connecting the front and rear stretcher tubes. The longer leg portion forms one leg of a triangle which includes the compression member and a seat track covering member. The design provides greatly improved passenger leg room for close pitch seating arrangements.

5 Claims, 6 Drawing Figures

U.S. Patent  Mar. 1, 1983  4,375,300
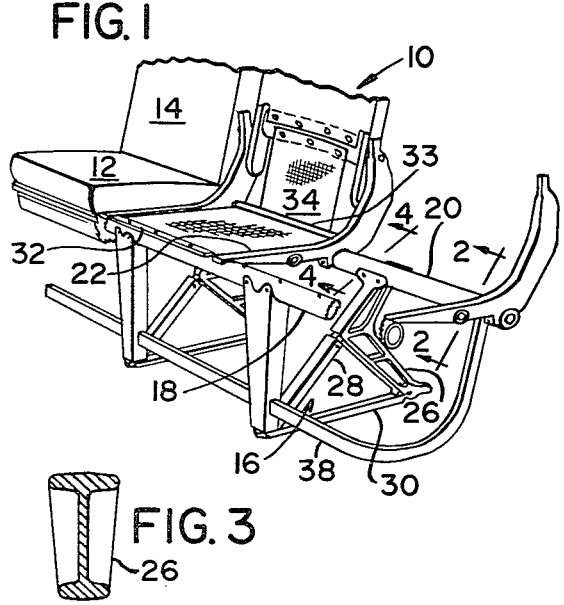
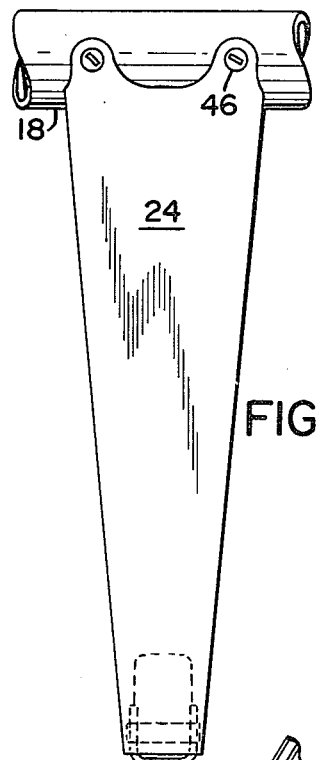
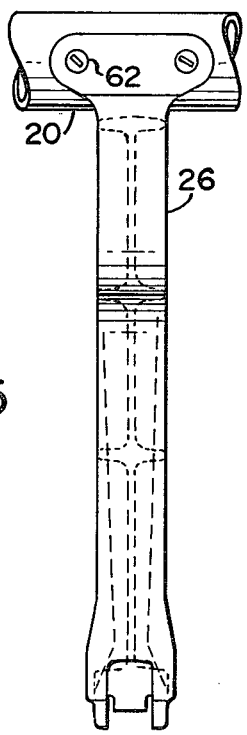
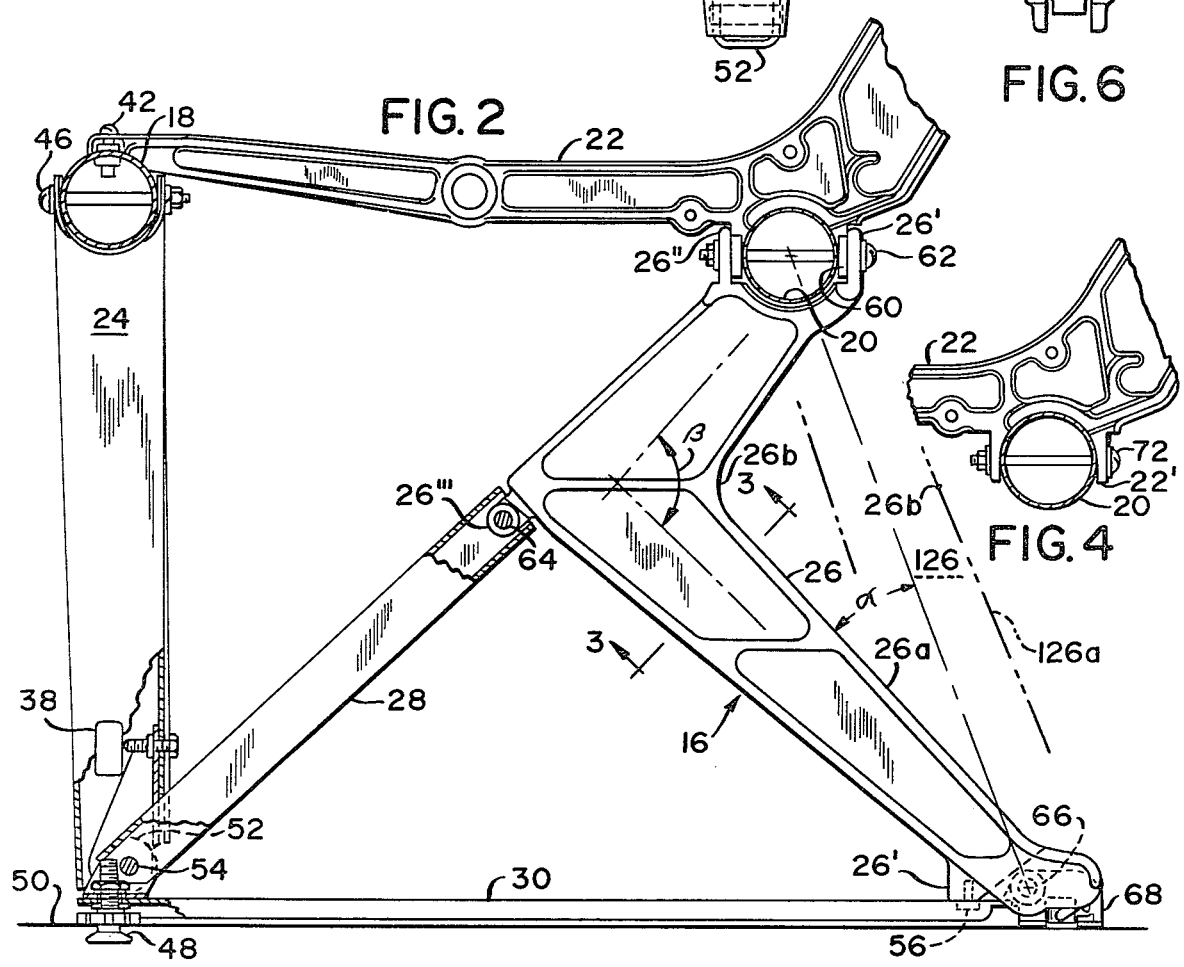

FRAMING SYSTEM FOR AIRCRAFT PASSENGER SEAT

BACKGROUND OF THE INVENTION

The invention relates to seating and particularly to multi-passenger seating for use in aircraft. As fuel and other costs of owning and operating aircraft have increased, it has been found desirable to increase the seating density. This action serves to increase revenue during those trips when the aircraft is fully loaded and thus reduces the need to increase ticket prices to achieve a desired level of earnings. For example, by moving from a configuration of 30 rows at a 35" pitch to 36 rows at a 29" pitch, 6 rows can be gained. Obviously, however, passengers like to be comfortable during a long trip. Thus, if they find that one airline's seats are so closely pitched that their knees contact the seat in front of them or that they cannot move their feet or legs without bumping into the rear seat legs, they might prefer to take their next flight on another airline that has more comfortable seating arrangements.

Stringent federal regulations for aircraft seats and the design of the seat retaining tracks incorporated in all aircraft make it almost mandatory that the mounting studs of the front and rear legs of a seat be spaced apart at least about 18 inches. Such large spacings are necessary since it is essential that a fully loaded seat withstand 9 g's of force without pulling out of the seat track. For a three-person seat weighing 55 pounds, this means that 5,625 pounds of loading must be absorbed since the total weight of three passengers is assumed to be 510 pounds and the total weight of the underseat luggage is assumed to be 60 pounds. As the pitch or distance between a given point on a pair of seats is reduced, the restricting effect on a passenger's freedom to move his feet and legs and to stow his carry-on baggage is greatly magnified. For example, assuming an 18" front to rear leg spacing distance, a 33" seat pitch spacing will leave a 15" space between the rear leg of one seat and the front leg of the next, while a 29" pitch will reduce this space to 11". In other words, a 12% reduction in seat pitch spacing will produce a 27% reduction in leg space.

SUMMARY

It is among the objects of the present invention to provide an aircraft seat framing system which will adequately handle the loading applied to it in a crash situation while increasing the space available to a passenger for moving his feet and legs as compared to prior art seats having the same front-to-rear leg spacing and seat pitch distances.

The foregoing and other objects are achieved by the improved framing system of the present invention wherein the tubular straight tension member typically used as a rear leg is replaced by a generally L-shaped member and a tubular compression member. The L-shaped member is positioned in a inverted and angled manner so that its longer leg portion is anchored to the seat track and its shorter leg portion is anchored to the rear stretcher tube which traverses the width of the seat under the rear portion of the seat cushions. The shorter leg portion is positioned so that it is aligned with the tubular compression member and is attached thereto so as to join the lower end of the front leg to the rear stretcher tube. The L-shaped member is preferably forged of aluminum and provided with a large cross-section in the fore and aft direction, especially in the region near the juncture of its leg portions, to maximize its stiffness and its ability to resist straightening out under tension loading. If the member did tend to straighten out, it would raise the center of gravity of the seat, thus increasing the moments and forces exerted on the seat and accelerating its failure. The rearmost surface of the longer leg portion of the L-shaped member is positioned at an angle of at least 10° and preferably about 22½° forward of the intersection of the rearmost surface with an imaginary line drawn between the axis of the rear stretcher member and the point at which the L-shaped member is attached to the seat track fitting. This angle produces several inches of recessed area which is available for permitting a passenger to move his feet or cross his legs. The upwardly sloping rear surface of the member also serves as a convenient foot rest.

BRIEF DESCRIPTION OF THE DRAWINGS

FIG. 1 is a perspective view of a multi-passenger seat which is partially broken away to illustrate the improved framing system;

FIG. 2 is a partially broken away sectional view taken on line 2—2 of FIG. 1;

FIG. 3 is a sectional view taken on line 3—3 of FIG. 2;

FIG. 4 is a fragmentary sectional view taken on line 4—4 of FIG. 1;

FIG. 5 is a front view of the front seat leg; and

FIG. 6 is a front view of the rear seat leg.

DESCRIPTION OF THE PREFERRED EMBODIMENT

Referring to FIG. 1, a three-passenger seat unit is indicated generally at 10 and can be seen to generally comprise seat cushions 12, back cushions 14, and a framing assembly indicated generally at 16. The framing assembly includes a front stretcher tube member 18, a rear stretcher tube member 20, and fore and aft arm support members 22 mounted to the stretcher tubes 18,20. It further includes tubular front leg members 24, rear leg members 26, tubular compression members 28, and channel-shaped horizontal track cover members 30. The seat cushions 12 are supported by a fabric panel or diaphragm 32 which is attached at its front edge to the stretcher tube 18 and at its rear edge to a rod 33 supported by the members 22. The back cushion 14 is supported by a back diaphragm portion 34. A baggage bar member 38 passes through apertures in the front legs 24 for restraining the forward movement of luggage stored under the seat.

FIG. 2 illustrates additional details of the framing assembly 16, including the fasteners 42 that fasten the fore and aft support member 22 to the stretcher tube 18; the fasteners 46 that fasten the front legs 24 to the stretcher tube 18; the track mounting stud 48 which engages the seat track 50 and holds together the U-shaped bracket 52 and track cover member 30; the fastener 54 which holds together the front leg 24, the bracket 52 and the tube 28; the fastener 56 which holds the track cover 30 to a portion 26' of the rear leg 26; spacers 60 which fill the space between vertical retaining portions 26" of the rear leg 26 and are attached to the rear stretcher member 20 by through bolts 62; retaining fastener 66 which holds the rear leg 26 to the rear track fitting member 68; and fastener 64 which retains the upper end of tube 28 to a projecting portion 26''' of the rear leg 26.

FIG. 4 illustrates one manner in which projecting portions 22' of the fore and aft support member 22 may be attached to the rear tube 20 by a fastener 72. Alternatively, the member 22 may be positioned directly over the leg 26 and retained by the fastener 62. In the latter situation, the spacers 60 would be omitted.

FIGS. 5 and 6 are front plan views of the front leg 24 and the rear leg 26, respectively. The front leg 24 is fastened to the front stretcher tube 18 by fasteners 46 and the rear leg 26 is fastened to the rear stretcher tube 20 by fasteners 62. The rear leg is preferably forged and has thin walls and wide flanges to minimize its weight as seen in FIGS. 3 and 6.

As best seen in FIG. 2, the novel construction of the framing assembly 16 permits the rear surface 26a of the leg 26 to be positioned considerably forward from the conventional position of a rear leg. The surface 26a is positioned at an angle $\alpha$ forwardly of the intersection of the surface 26a with an imaginary line connecting the axis of the rear stretcher tube 20 and the axis of the fastener 66 by which the leg is pinned to the track fitting 68. The angle $\alpha$ should be at least 10° and preferably about 22.5° so that the clearance space rearwardly of point 26b will be a maximum so as to better accommodate the legs and feet of a passenger seated in the next seat. As compared to a conventional rear leg indicated in phantom as 126, the improved framing system permits the point 26b on angled leg member 26 to be located at least about 4½" forward of a point 126b on the rear surface 126a of a conventional rear leg. This insures ample space for a passenger to cross his legs. Additionally, the wide flat surface 26a defines a convenient foot rest which some passengers might find to be useful.

Preferably, the parts 22 and 26 are formed as aluminum forgings for maximum strength and light weight. The other parts 18, 20, 24, 28 and 30 are preferably formed as tubes or channels. The L-shaped rear legs 26 has a maximum depth at the junction of its long and short leg portions since that is the area where seating loads or crash loads will tend to reduce or enlarge, respectively, the angle $\beta$ between the center lines of the long and short leg portions.

We claim as our invention:

1. A framing system for supporting a plurality of seats in a multi-passenger seating unit having a forward stretcher member, a rearward stretcher member positioned parallel to and spaced from said forward stretcher member, a plurality of fore and aft extending support members attached to each of said stretcher members, a plurality of seat cushion supporting panels joined to said stretcher members and located between adjacent pairs of said plurality of support members, a plurality of front leg support members attached to and extending downwardly from said forward stretcher member and adapted to be attached at their lower ends to a seating track member, a plurality of rear leg support members attached to and extending downwardly from said rear stretcher member and adapted to be attached at their lower ends to a seating track member, and a track covering connecting member being joined to the lower ends of said front leg and near leg support members, the improvement wherein said rear leg support member is characterized in that it is of an integral, generally inverted "L" shape with the long leg of the "L" terminating at the lower end of said rear leg support member and with the short leg of the "L" being attached to said rear stretcher member, the juncture of the long and short legs including a connection portion at its forwardmost surface to which the upper end of a compression member is joined, said compression member being joined at its lower end to the lower end of said front leg support member, the longer leg of said rear leg support member being directed upwardly and forwardly from the point where it is adapted to be attached to the seating track member at such an angle that the major portions of the rear surfaces of both said longer leg of said "L" and said shorter leg, as measured from their juncture, lies forwardly of an imaginary line connecting the axis of the rear stretcher member and said point at which said rear leg support member is adapted to be attached to the seating track member.

2. The framing system of claim 1 wherein the rearwardmost surface portion of said major portion of said longer leg is forward of a line located at least 10° forwardly from said imaginary line about an axis of rotation centered on the point of intersection of said imaginary line with said rearwardmost surface portion.

3. The framing system of claim 1 wherein the rearwardmost surface portion of said major portion of said longer leg is forward of a line located at least 20° forwardly from said imaginary line about an axis of rotation centered on the point of intersection of said imaginary line with said rearwardmost surface portion.

4. The framing system of claim 1 wherein the rearwardmost surface portion of said major portion of said longer leg is forward of a line located about 22½° forwardly from said imaginary line about an axis of rotation centered on the point of intersection of said imaginary line with said rearwardmost surface portion.

5. The framing system of claim 1 wherein said long leg and short leg of said "L" are tapered in width along their length and have their greatest width at their juncture.

* * * * *